June 17, 1930.  V. LEFEBURE  1,763,973
MANUFACTURE OF HOSE
Filed June 8, 1926

Inventor
Victor Lefebure,
By Toulmin & Toulmin
Attorneys

Patented June 17, 1930

1,763,973

UNITED STATES PATENT OFFICE

VICTOR LEFEBURE, OF FULHAM, LONDON, ENGLAND

MANUFACTURE OF HOSE

Application filed June 8, 1926, Serial No. 114,572, and in Great Britain July 9, 1925.

This invention relates to the manufacture of hose, and has for its object to provide a petrol and solvent resisting hose.

The invention has been more particularly devised with the object of providing a petrol and solvent resisting hose, and in consequence I will describe the invention with reference thereto by way of example. It is, however, to be understood that hose made according thereto is also valuable for other purposes, for example, it may be used for conducting heated liquids, such as hot oils and tar, and also steam, and the hose may be used for any purpose without departing from the scope of the invention.

Hitherto hose, as used for the conveyance of organic solvents, such as petrol, has been manufactured from various materials of which the chief are canvas or other fabric and rubber. In this case various plies of canvas impregnated with rubber, alternating with rubber plies, are used, the rubber mix being usually specially designed to afford maximum resistance to the solvent. Practically all such hoses show, in some measure, two great disadvantages. In the first place, they discolour the petrol or organic solvent, and it is practically impossible to compound rubber in such a way as to eliminate or even reduce the discolouration to negligible proportions. Secondly, all rubber mixes show a tendency to swell in petrol and other organic solvents, in which state the cured rubber is very much weaker mechanically, being easy to cut or to crack, or to tear by abrasion.

For these main reasons, other petrol hoses have been devised made for example from canvas and other fabric impregnated with hardened oil, sometimes oxidized, or from catgut. Of these the first has the great disadvantage of cracking and flaking, which increases with time, and the second is not only very costly, but is not readily made up in long lengths and large sizes.

A hose made according to the present invention is provided with at least one ply of fabric impregnated and/or coated with a synthetic resin which is non-swelling and non-staining in organic solvents, such as for example petrol.

Further, according to the invention, the hose is provided with an inner and outer surface of fabric impregnated and/or coated with a synthetic resin, and an intermediate ply of rubber.

Figure 1:
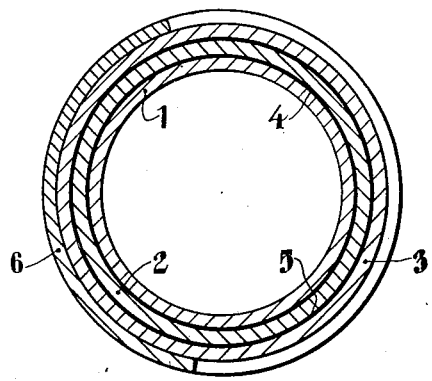
Figure 2:
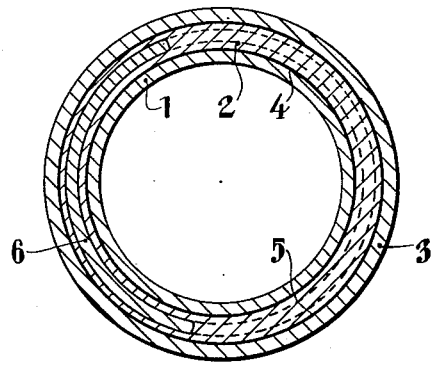

Figure 1 is a cross section of the hose taken at any point along the hose. Figure 2 shows the hose with the reenforcements embedded in the rubber. In the drawings the inner and outer plies of fabric are indicated by the numerals 1 and 3, while the intermediate ply of rubber is indicated by the numeral 2. The metallic reenforcement used to reenforce the walls of the hose is indicated by the numeral 6, whereas the rubber mix used for the purpose of uniting the outer layers to the intermediate layer is indicated by the reference characters 4 and 5.

The synthetic resins are used for the non-swelling and non-staining agents, and are preferably synthetic resins of the phenoli-aldehyde, urea-aldehyde or thio-urea aldehyde type. I do not limit myself to using the pure resins alone, but can employ resin mixes containing substances to modify the properties of the resin, such as colour, flexibility, hardness, and so forth. This applies wherever synthetic resin is mentioned.

Thus, coloured powders and dystuffs may be added for colour effect; fibrous fillers, such as woodmeal and asbestos, for tensile strength and flexibility; recognized softeners, such as oils; and inert powders, such as china clay and silica, to give dilution without influencing the resistant properties of the resin impregnation.

The usual hose manufacturing practice is followed according to the strength, bulk and type of hose required, and the hose may be made of one, two, three or multiple plies. One or more plies of the resin fabric, and one or more plies of the rubber may be employed.

One method given by way of example, which is particularly suitable to wed the resined canvas to a rubber layer is to cover one side of the resined canvas with a thin layer of rubber mix, either frictioned on or applied by any other method common to the industry. These layers of rubber mix are shown at 4 and 5 on the drawing. The petrol resistance of the different rubber layers may be strengthened by mixing in the rubber mix, before curing, a certain proportion of synthetic resin. An alternative method which can be employed is to build up the hose in the usual way, and by spraying, dipping or painting, impregnate and coat the inner and outer layers with synthetic resin.

The following method of constructing a hose according to the present invention is given by way of example.

The canvas is impregnated with phenol-formaldehyde resin dissolved in methylated spirit, the impregnated canvas allowed to dry, and a thin skin of rubber mix, which may but need not be petrol resisting is run on to one side of the canvas by means of a calender. The composite layer is built up in the usual way on mandrils, vulcanized and removed from the mandril. The hose may be internally wired or externally armoured with wire, or may have wire embedded. In fact, any of the usual hose operations may be incorporated.

For a semi-rigid less flexible hose, the rubber can be reduced or entirely eliminated, and for a highly flexible hose actual layers of rubber sheet can be interposed between the plies of composite layer as in standard hose practice.

If the hose is provided with an outer ply of resined fabric it presents a much harder surface to abrasion, and gives a more permanent hose.

What I claim and desire to secure by Letters Patent is:—

1. A hose resisting organic solvents, comprising an outermost and in innermost ply of fabric impregnated with a synthetic resin, and an intermediate layer of rubber, whereby one of said impregnated layers is subjected to the direct effects of the said organic solvents.

2. A hose resisting organic solvents, comprising an outermost and an innermost ply of fabric impregnated with a synthetic resin of the aldehyde type, and an intermediate ply of rubber united to the outermost and innermost plies by a rubber mix, whereby one of said impregnated layers is subjected to the direct effects of the said organic solvents.

3. A hose resisting organic solvents, comprising at least one ply of fabric impregnated with a synthetic resin of the urea-aldehyde type, one ply of fabric being subjected to the immediate effects of said organic solvents.

4. A hose resisting organic solvents, comprising at least one ply of fabric impregnated with a synthetic resin of the thio-urea-aldehyde type, one ply of fabric being subjected to the immediate effects of said organic solvents.

5. A hose resisting organic solvents, comprising an inner and an outer ply of fabric impregnated with a synthetic resin and an intermediate ply of rubber, said inner ply being subjected to the immediate effects of organic solvents passing through said hose.

6. A hose resisting organic solvents, comprising an inner and an outer ply of fabric impregnated with a synthetic resin of the aldehyde type, and an intermediate ply of rubber, said inner ply being subjected to the immediate effects of organic solvents passing through said hose.

7. A hose resisting organic solvents, comprising an inner and an outer ply of fabric impregnated with a synthetic resin of the urea-aldehyde type and an intermediate ply of rubber, said inner ply being subjected to the immediate effects of organic solvents passing through said hose.

8. A hose resisting organic solvents, comprising an inner and an outer ply of fabric impregnated with a synthetic resin of the thio-urea-aldehyde type and an intermediate ply of rubber, said inner ply being subjected to the immediate effects of organic solvents passing through said hose.

9. A hose resisting organic solvents, comprising at least one ply of canvas impregnated with a synthetic resin and at least one layer of rubber, said hose having one ply of impregnated canvas subjected to the direct effects of organic solvents passing through said hose.

10. A hose resisting organic solvents, comprising at least one ply of canvas impregnated with a synthetic resin of the thio-urea-aldehyde type, said hose having one ply of impregnated canvas subjected to the direct effects of organic solvents passing through said hose.

11. A hose resisting organic solvents, comprising an inner and an outer ply of canvas impregnated with a synthetic resin, said hose having one ply of impregnated canvas subjected to the direct effects of organic solvents passing through said hose.

12. A hose resisting organic solvents, comprising an inner and an outer ply of canvas impregnated with a synthetic resin of the thio-urea-aldehyde type and an intermediate ply of rubber, said hose having one ply of impregnated canvas subjected to the direct effects of organic solvents passing through said hose.

13. A hose resisting organic solvents, comprising an inner and an outer layer of canvas impregnated with a synthetic resin of the thio-urea-aldehyde type, said inner layer being so located as to be subjected to the immediate effects of any organic solvents passing through the hose and said inner and outer layers being covered on one side with a thin layer of rubber mix adapted to unite the several plies of vulcanizing, and an intermediate ply of rubber.

14. A hose resisting organic solvents, comprising an inner and an outer layer of canvas impregnated with a synthetic resin of the thio-urea-aldehyde type, said inner layer being so located as to be subjected to the immediate effects of any organic solvents passing through the hose, and said inner and outer layers being covered on one side with a thin layer of rubber mix adapted to unite the several plies on vulcanizing, and an intermediate ply of rubber, the whole being vulcanized.

15. A hose resisting organic solvents, comprising an inner and an outer layer of canvas impregnated with a synthetic resin of the thio-urea-aldehyde type, said inner layer being so located as to be subjected to the immediate effects of any organic solvents passing through the hose, and said inner and outer layers being covered on one side with a thin layer of rubber mix mixed with synthetic resin for improving the petrol resistance of the rubber, and adapted to unite the several plies on vulcanizing and an intermediate ply of rubber, the whole being vulcanized.

16. A hose resisting organic solvents, comprising an inner and an outer layer of canvas impregnated with a synthetic resin of the thio-urea-aldehyde type, said inner layer being so located as to be subjected to the immediate effects of any organic solvents passing through the hose, and said inner and outer layers being covered on one side with a thin layer of rubber mix mixed with synthetic resin for improving the petrol resistance of the rubber and adapted to unite the several plies on vulcanizing, the hose being reenforced with wiring and an intermediate ply of rubber, the whole being vulcanized.

17. A hose resisting organic solvents, comprising an inner and an outer layer of canvas impregnated with a synthetic resin of the thio-urea-aldehyde type, said inner layer being so located as to be subjected to the immediate effects of any organic solvents passing through the hose, and an intermediate ply of rubber, the several plies being united by covering one side of the resined fabric with a thin layer of rubber mix, the petrol resistance of the rubber being improved by mixing with the rubber mix some synthetic resin before vulcanizing the hose being reenforced with embedded wiring and the whole being vulcanized.

In testimony whereof, I affix my signature.

VICTOR LEFEBURE.